(12) United States Patent
Holung et al.

(10) Patent No.: US 8,298,693 B2
(45) Date of Patent: Oct. 30, 2012

(54) BATTERY WITH PRESSURE RELIEF CHANNEL

(75) Inventors: Joseph Anthony Holung, Wake Forest, NC (US); Tin-Lup Wong, Chapel Hill, NC (US); Bouziane Yebka, Cary, NC (US)

(73) Assignee: Lenovo (Singapore) Pte. :td., Singapore (SG)

( * ) Notice: Subject to any disclaimer, the term of this patent is extended or adjusted under 35 U.S.C. 154(b) by 0 days.

(21) Appl. No.: 13/427,186

(22) Filed: Mar. 22, 2012

(65) Prior Publication Data

US 2012/0177957 A1 Jul. 12, 2012

Related U.S. Application Data

(62) Division of application No. 12/252,794, filed on Oct. 16, 2008, now Pat. No. 8,163,408.

(51) Int. Cl.
*H01M 2/00* (2006.01)
*H01M 2/12* (2006.01)
*H01M 10/04* (2006.01)
*H01M 10/16* (2006.01)

(52) U.S. Cl. ............. 429/53; 429/50; 429/163; 429/186
(58) Field of Classification Search .................... 429/53, 429/60, 94, 163, 186; 220/203.08, 89.2, 220/397
See application file for complete search history.

(56) References Cited

U.S. PATENT DOCUMENTS

| | | | | |
|---|---|---|---|---|
| 3,558,356 A | * | 1/1971 | Jost | 429/60 |
| 3,575,730 A | * | 4/1971 | Doll | 429/83 |
| 4,610,370 A | * | 9/1986 | Patterson et al. | 220/203.08 |
| 2006/0275659 A1 | * | 12/2006 | Kim et al. | 429/186 |

* cited by examiner

*Primary Examiner* — Jonathan Crepeau
*Assistant Examiner* — Kenneth Douyette
(74) *Attorney, Agent, or Firm* — John L. Rogitz; John M. Rogitz

(57) ABSTRACT

A battery having an outer casing and an anode/cathode assembly within that casing, wherein the anode/cathode assembly includes plural anodes and cathodes and electrolyte therebetween. The battery has a pressure relief feature associated with the casing and a channel preservation element sufficiently rigid to preserve at least one gas passageway to the pressure relief feature under conditions of anode/cathode assembly warpage. Thus the gas in the passageway will not become impeded by anode/cathode assembly warpage.

17 Claims, 3 Drawing Sheets

FIG. 7  FIG. 8  FIG. 9  FIG. 10

BATTERY WITH PRESSURE RELIEF CHANNEL

This is a divisional of U.S. Ser. No. 12/252,794 filed on Oct. 16, 2008, now U.S. Pat. No. 8,163,408, from which priority is claimed.

FIELD OF THE INVENTION

The present invention relates generally to providing pressure relief in batteries.

BACKGROUND

Batteries are used for many applications, including to power portable consumer electronics devices such as wireless computers and cellular phones. Because gases can build up during battery operation, pressure relief structure, be it a relief valve or simple score in the battery casing designed to fail before the rest of the casing, typically is provided.

As understood herein, however, batteries can and do catastrophically fail notwithstanding the pressure relief features because the anode/cathode structure inside the casing can warp sufficiently to block the gas path to the pressure relief feature.

SUMMARY OF THE INVENTION

A battery has an outer casing and an anode/cathode assembly within the casing. The assembly includes plural anodes and cathodes and electrolyte therebetween. At least one pressure relief feature is associated with the casing. A channel preservation element that is sufficiently rigid to preserve at least one gas passageway to the pressure relief feature under conditions of anode/cathode assembly warpage is also provided.

The channel preservation element can be disposed between the casing and the assembly. In addition or alternatively, the channel preservation element can be centrally disposed within the assembly. The channel preservation element may include a mesh.

In some embodiments the channel preservation element includes at least one concavity or convexity formed in the outer casing. In other embodiments the channel preservation element includes plural round channels. In still other embodiments the channel preservation element includes plural non-round channels.

In another aspect, a battery has a battery casing and means for providing pressure relief from gas build up in the battery casing. Means are provided for ensuring that at least one gas passageway exists in the casing to the means for providing pressure relief.

In another aspect, a method for providing pressure relief from gas build up in a battery includes providing a channel preservation element sufficiently rigid to preserve at least one gas passageway under operating conditions in a battery. The method also includes disposing the element between a casing and a jelly roll and/or centrally in the jelly roll such that the channel communicates with a pressure relief feature. The "or" in "and/or" is intended to be the exclusive form and would not require both options to be present at the same time.

The details of the present invention, both as to its structure and operation, can best be understood in reference to the accompanying drawings, in which like reference numerals refer to like parts, and in which:

BRIEF DESCRIPTION OF THE DRAWINGS

FIGS. 7-10 are enlarged views of segments of the battery of FIG. 6 illustrating further example channel preservation elements.

DETAILED DESCRIPTION OF THE PREFERRED EMBODIMENT

Figure 1:
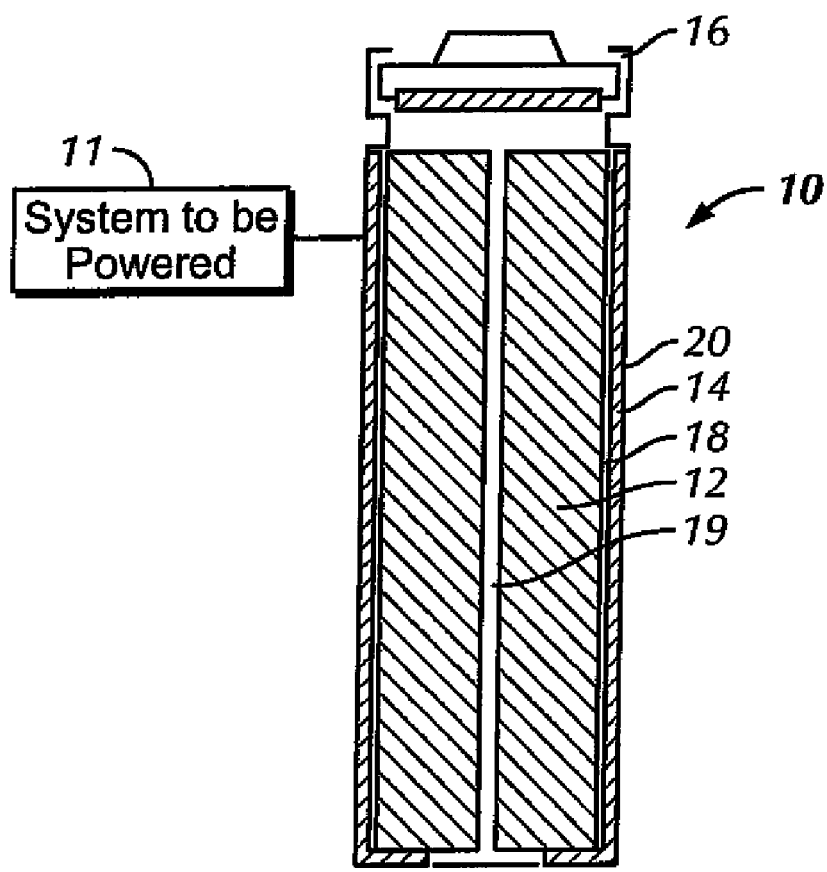
FIG. 1 is a side elevational view of an example non-limiting battery in accordance with present principles.

Referring initially to FIG. 1, a battery 10 that can incorporate one or more of the below-discussed battery cells may be removably engaged with an electronic component 11 such but not limited to a notebook computer, wireless telephone, vehicle electric system, etc. to power internal parts thereof such as a processor, visual display, etc. Typically the battery 10 is engaged with a battery well or receptacle of the component 11. The battery 10 may be rechargeable and may be a Lithium-ion battery. The structure of the battery may be, without limitation, cylindrical or prismatic.

The battery 10 in FIG. 1 has a jelly roll 12 and a casing 14. By "jelly roll," is meant the cathode-anode-electrolyte assembly internal to the outer casing of the battery. Generally, a gas vent channel may be established in the center void of a jelly roll and/or between a jelly roll and an outer casing by a channel-preserving structure such as the examples shown herein. In non-limiting examples, the channel-preserving structure may be established by an electrically insulative flame-proof fabric mesh or a metal or plastic cage-like structure.

Moving on, the battery 10 has a pressure relief feature 16, the pressure relief feature 16 being capable of allowing gas to exit the battery 10. Generally, a jelly roll contained in a battery may expand or warp inside a casing because of excessive heat, stress, or many other factors. It is this expansion that causes a gas vent channel to become blocked, disallowing gas from reaching a pressure relief feature.

Thus, at least one gas vent channel 18 is either annularly disposed between the jelly roll 12 and the casing 14 and/or centrally disposed in a void 19 of the jelly roll 12, the gas vent channel 18 being protected by a preservation element 20. The preservation element 20 is sufficiently rigid so as to prevent expansion or warpage of the jelly roll 12 into the channel 18, in a way that would completely block the channel 18.

The rigid structure of the preservation element 20 prevents the jelly roll 12 from expanding to the point of completely blocking the pressure relief channel. As indicated above, if the jelly roll 12 were to unduly expand or warp for any reason, the channel 18 may become partially or completely blocked, thereby impeding gas from traveling through the channel 18 toward the pressure relief feature 16. Further, if the channel 18 were to become blocked, the trapped gas may result in many unintended consequences such as battery malfunction, battery explosion, or the battery catching on fire, to list a few. Thus, a rigid, fixed path for gas to reach the pressure relief feature 16 is critical to the present invention.

Figure 2:
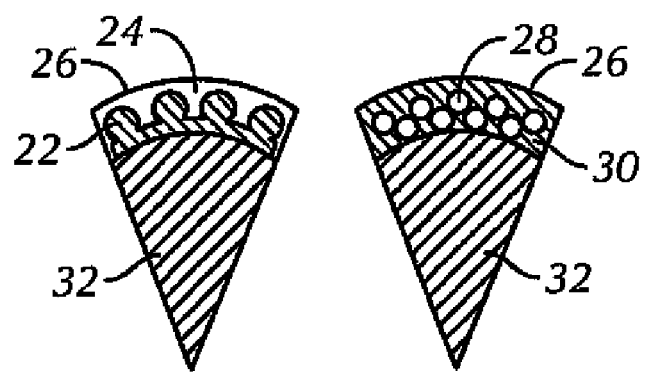
FIG. 2 shows two top plan views showing pie-shaped segments of otherwise disk-shaped cross-sections the battery to illustrate various channel-preserving structures.

FIG. 2 shows two partial cross sectional views of different, non-limiting configurations for a preservation element placement in relation to a channel to prevent a jelly roll from partially or totally blocking the channel. In both instances shown in FIG. 2, the preservation element is disposed between a battery casing and a jelly roll.

In the first non-limiting embodiment shown on the left in FIG. 2, a preservation element 22 is disposed within a channel 24 and is placed between by an outer casing 26 and a jelly roll 32, where the rigid structure of the preservation element 22 maintains the void space in the channel 24 between the element 22 and the casing. Specifically, as shown the periphery of the element 22 has a series of rounded nodules facing the cylindrical wall of the casing to establish a series of longitudinal channels therebetween.

Still with reference to FIG. 2, another non-limiting configuration for a preservation element placed in a channel is shown. In this instance, an internally porous preservation element 30 encases at least one channel 28 and is placed between the jelly roll 32 and the outer casing 26. Thus, the rigid structure of the preservation element 30 surrounding at least one channel 28 prevents the jelly roll 32 from expanding or warping into void channel space which must remain vacant for gas to reach a pressure relief feature.

Figure 3:
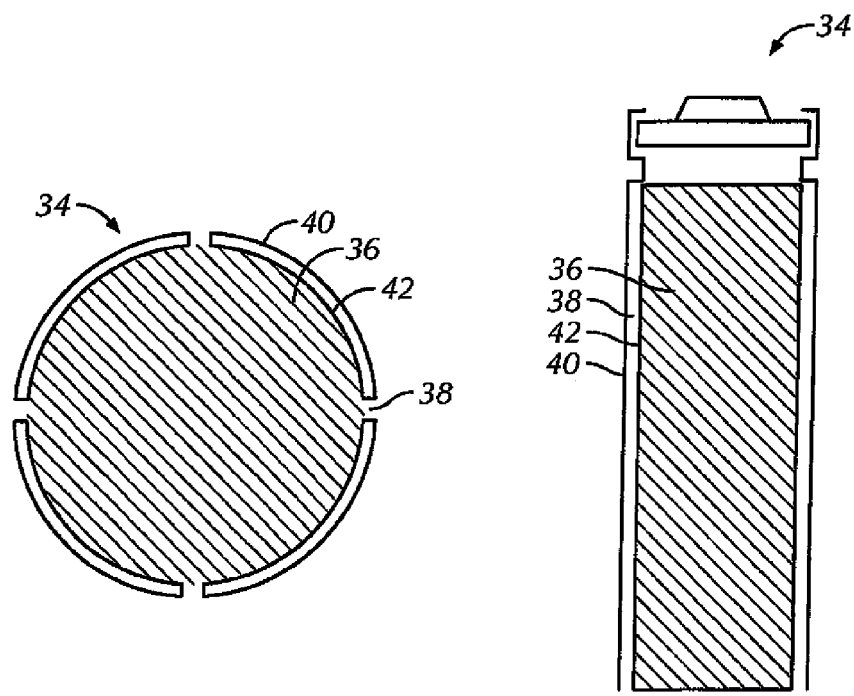
FIG. 3 shows a battery and a channelled tape that can be used between the jelly roll and casing of the battery in an exploded enlarged relationship therewith for illustration.

Moving to FIG. 3, yet another non-limiting embodiment of a channel preservation element is shown. In both the cross sectional view and side view provided in FIG. 3, a battery 34 has a jelly roll 36, at least one gas vent channel 38, and an outer casing 40. The battery 34 also has a channel preservation element 42 that is sufficiently rigid to preserve at least one gas passageway to a pressure relief feature. Distinguishing FIG. 3, the channel preservation element 42 is disposed between the jelly roll 36 and casing 40 and may be a substrate such as tape that forms the channel(s) 38 which are longitudinal relative to the battery 34. Further, the longitudinal channel(s) created by the preservation element 42 may be either concave or convex in shape against to the casing 40.

Figure 4:
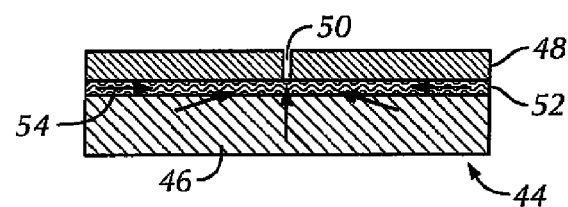
FIG. 4 shows another example embodiment of a battery with channel preservation element.

Now referencing FIG. 4, a channel preservation element particularly for a non-limiting prismatic-shaped battery is shown. In the FIG. 4 cross sectional view, the battery 44 has a jelly roll 46, a casing 48 and a pressure relief feature 50 such as a pressure relief valve or weakened portion of the casing. Further, the battery 44 has at least one channel 52 located between the jelly roll 46 and casing 48, and the channel 52 is maintained by a preservation element 54. The arrows in FIG. 4 represent various directions gas may travel through the channel 52 to reach the pressure relief feature 50, where the gas may then exit the prismatic-shaped battery 44. The channels 52 established by the channel preservation element 54 are, as shown, sinusoidal or zig-zag in shape.

Figure 5:
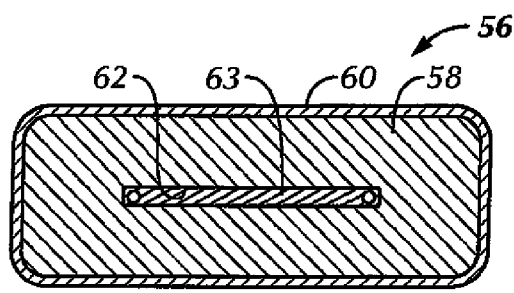
FIG. 5 is a plan view of a battery with centrally-disposed channel preservation element.

Another non-limiting embodiment of a channel preservation element particularly suited for a prismatic shaped battery is shown in FIG. 5. FIG. 5 shows a rectangular cross section of the non-limiting embodiment. A battery 56 being substantially rectangular in shape has a jelly roll 58 and a casing 60. Both the jelly roll 58 and casing 60 are also substantially rectangular in shape. The battery 56 also has a central gas vent channel 62 and a channel preservation element 63 to maintain the channel 62. In FIG. 5, the jelly roll 58 surrounds the channel 62 and its preservation element 63, which are both centrally disposed within the battery 56. The element 63 may be established by, without limitation, a tube that is separate from the jelly roll and that is made of steel, aluminum, plastic, etc. that is loaded onto the mandrel around which the jelly roll is wrapped, with the tube being left in place after the mandrel is removed as indicated by the holes in the element 63, or the element 63 may be a porous core such as, for example, a fabric mesh as described above that is folded upon itself in several layers.

Figure 6:
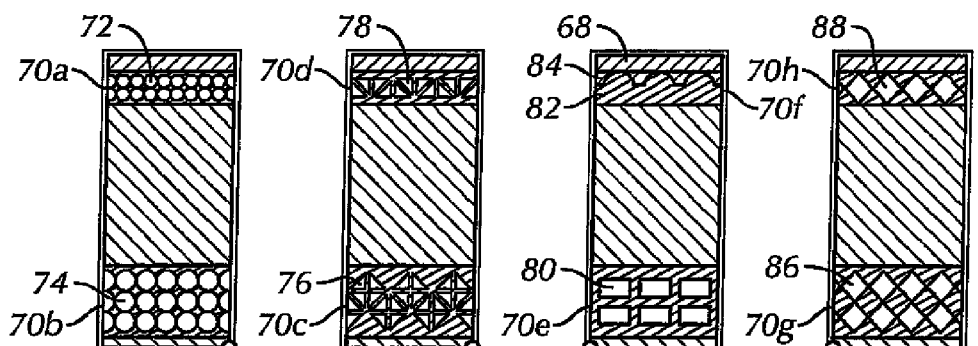
FIG. 6 is a plan view of a battery with both a central and an outer channel preservation element.
Figure 6:
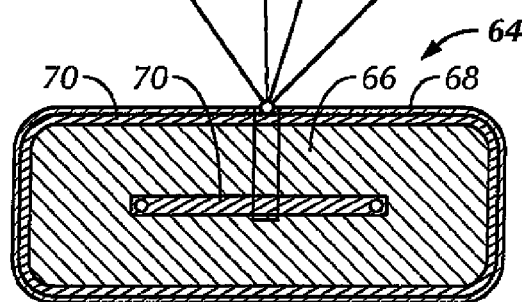

Moving to FIG. 6, one non-limiting rectangular or square battery 64 has a jelly roll 66 and an outer casing 68, both substantially similar in function to those in previous non-limiting embodiments provided above. The battery 64 also has at least one channel preservation element 70 which may either be centrally disposed within the battery 64 and/or disposed between the jelly roll 66 and outer casing 68.

FIGS. 7-10 show various example channel configurations that may be used in the channel preservation element 70. While FIGS. 7-10 show various channel configurations in inner and outer channel preservation elements, it is to be understood that a configuration shown in the case of an outer element may be used for an inner element and vice-versa.

In FIG. 7, an outer channel preservation element 70a is formed with small circular shaped channels 72, and an inner channel preservation element 70b is formed with relatively larger circular shaped channels 74 to maintain an unobstructed path for gas to travel to the pressure relief feature of the battery 64.

Alternatively, FIG. 8 shows that an inner channel preservation element 70c may be formed with plural series of four triangular channels 76, with each series of four being arranged in a diamond pattern as shown. An example outer channel preservation element 70d may be formed with plural series of triangular channels 78, with each series including two right triangles with their hypotenuses facing each other.

FIG. 9 shows yet another non-limiting rectangular embodiment of a channel design formed in a channel preservation element 70e, in which plural channels 80 of rectilinear cross-section are arranged in multiple rows as shown. An outer channel preservation element 70f may also be provided and formed with multiple rounded nodules 82 on its outer periphery, facing the casing 68, to establish channels 84 between the casing 68 and nodules 82. The nodules 82 may contact the casing 68 as shown.

FIG. 10 shows yet another channel preservation element 70g disposed centrally in the battery and establishing two rows of diamond-shaped channels 86, while an outer channel preservation element 70h includes a single row of diamond-shaped channels 88.

While the particular BATTERY WITH PRESSURE RELIEF CHANNEL is herein shown and described in detail, it is to be understood that the subject matter which is encompassed by the present invention is limited only by the claims.

What is claimed is:

1. A battery comprising:
   an outer casing;
   an anode/cathode assembly within the casing, the assembly including plural anodes and cathodes and electrolyte therebetween;
   at least one pressure relief feature associated with the casing; and
   a channel preservation element sufficiently rigid to preserve at least one gas passageway to the pressure relief feature under conditions of anode/cathode assembly warpage, wherein the channel preservation element is centrally disposed within the assembly; and
   wherein the channel preservation element includes plural non-round channels adjacent to each other and/or closely juxtaposed to each other.

2. The battery of claim 1, wherein the channel preservation element includes a mesh.

3. The battery of claim 1, wherein a second channel preservation element includes at least one concavity or convexity formed in the outer casing.

4. The battery of claim 1, wherein a second channel preservation element includes plural round channels.

5. The battery of claim 1, wherein one or more of the plural non-rounded channels are formed as a channel selected from the group consisting of: a triangular channel, a rectangular channel, and/or a diamond-shaped channel.

6. A battery comprising:
a battery casing;
means for providing pressure relief from gas build up in the battery casing; and
means for ensuring that at least one gas passageway exists in the casing to the means for providing pressure relief;
wherein the means for providing pressure relief includes at least one pressure relief feature, and the means for ensuring includes at least one channel preservation element; and
wherein the channel preservation element includes plural non-round channels.

7. The battery of claim 6, further comprising an anode/cathode assembly in the casing.

8. The battery of claim 6, wherein the plural non-round channels are adjacent to each other and/or closely juxtaposed to each other.

9. The battery of claim 7, wherein the channel preservation element is centrally disposed within the assembly.

10. The battery of claim 6, wherein the channel preservation element includes a mesh.

11. The battery of claim 6, wherein the channel preservation element includes at least one concavity or convexity formed in the outer casing.

12. A method for providing pressure relief from gas build up in a battery, comprising:
providing a channel preservation element sufficiently rigid to preserve at least one gas passageway under operating conditions in a battery; and
disposing the element centrally in the jelly roll such that the channel communicates with a pressure relief feature;
wherein the element includes plural non-round channels.

13. The method of claim 12, wherein the channel preservation element is a mesh.

14. An apparatus comprising:
an outer casing;
an anode/cathode assembly within the casing, the assembly including plural anodes and cathodes and electrolyte therebetween;
at least one pressure relief feature associated with the casing; and
a channel preservation element sufficiently rigid to preserve at least one gas passageway to the pressure relief feature under conditions of anode/cathode assembly warpage;
wherein the channel preservation element includes plural non-round channels.

15. The apparatus of claim 14, wherein the channel preservation element includes a mesh.

16. The apparatus of claim 14, wherein a second channel preservation element includes at least one concavity or convexity formed in the outer casing.

17. The apparatus of claim 14, wherein the plural non-round channels are adjacent to each other and/or closely juxtaposed to each other.

* * * * *